United States Patent [19]

Hisai et al.

[11] Patent Number: 5,766,767
[45] Date of Patent: Jun. 16, 1998

[54] COATING COMPOSITION PROCESS FOR FORMING CURED FILM AND COATED ARTICLE

[75] Inventors: Tsuneyoshi Hisai, Hirakata; Shigeyuki Sasaki, Takatsuki; Takeshi Takagi, Yawata; Yoshitaka Okude, Hirakata; Akira Fushimi, Ikoma; Hiroto Yoneda, Shijonawate, all of Japan

[73] Assignee: Nippon Paint Co., Ltd., Osaka, Japan

[21] Appl. No.: 696,836

[22] PCT Filed: Mar. 3, 1995

[86] PCT No.: PCT/JP95/00340

§ 371 Date: Aug. 27, 1996

§ 102(e) Date: Aug. 27, 1996

[87] PCT Pub. No.: WO95/23820

PCT Pub. Date: Sep. 8, 1995

[30] Foreign Application Priority Data

Mar. 3, 1994 [JP] Japan .................................. 6-033503

[51] Int. Cl.$^6$ .................................................. B32B 27/38
[52] U.S. Cl. ...................... 428/413; 427/379; 427/386; 427/410; 523/412; 525/438
[58] Field of Search .................................. 427/379, 410, 427/38.5, 386; 523/412; 525/438; 428/413

[56] References Cited

U.S. PATENT DOCUMENTS

| | | | |
|---|---|---|---|
| 3,065,195 | 11/1962 | Vasta | 260/41 |
| 4,275,290 | 6/1981 | Dudgeon | 528/361 |
| 5,128,018 | 7/1992 | Kiesele | 204/415 |
| 5,218,018 | 6/1993 | Tominaga et al. | 523/412 |
| 5,276,097 | 1/1994 | Hoffman et al. | 525/167 |
| 5,369,178 | 11/1994 | Miyazaki et al. | 525/155 |

FOREIGN PATENT DOCUMENTS

| | | |
|---|---|---|
| 0245021 | 4/1987 | European Pat. Off. . |
| 940695 | 2/1960 | United Kingdom . |

*Primary Examiner*—Michael Lusignan
*Attorney, Agent, or Firm*—Townsend & Banta

[57] ABSTRACT

The present invention provides a clear liquid coating composition comprising (a) a compound having at least 2 carboxyl groups, (b) a compound having at least 2 epoxy groups, (c) 0.01 to 3.0 parts by weight based on 100 parts by weight of the total resin solid of an onium salt, which is used as a top coating composition for a pre-coated surface.

42 Claims, No Drawings

COATING COMPOSITION PROCESS FOR FORMING CURED FILM AND COATED ARTICLE

FIELD OF THE INVENTION

The present invention relates to a thermocurable coating composition which is suitable for an automotive top coating composition or a coil coating composition, and to a process for forming a cured film using the coating composition and to an article having the cured film thereon.

BACKGROUND OF THE INVENTION

A coating composition for top coating an automobile generally contains, as a film forming binder, a combination of a hydroxyl group-containing polymer and a melamine resin. The cured film obtained from the melamine curing system, however, has poor acid resistance and is damaged by acid rain which has recently become one of serious problems. The damage of the film provides poor appearance.

In order to overcome the above mentioned defects, the present inventors have proposed novel coating compositions without employing the melamine resin in Japanese Kokai Publications 45577/1990 and 287650/1991. The proposed coating compositions comprises a polymer having a carboxyl and carboxylate group derived by half-esterifying an anhydride group, and a polymer having an epoxy group or an epoxy and hydroxyl group. Since the composition cures by means of a reaction of the carboxyl group with the epoxy group as well as carboxylate group with hydroxyl group, and it forms a cross-linking point made of ester bond. Therefore, the resulting cured film has good acid resistance and sufficient weather resistance for an automotive top coating.

However, to achieve good acid and weather resistance, the cured film have to have high cross-linking density, and the coating composition for forming the cured film have to comprise a reactive resin of high functionality, and it becomes essentially poor in storage stability. Therefore, there has been a continued need for methods in order to impart excellent storage stability to the coating composition comprising a reactive resin of high functionality.

SUMMARY OF THE INVENTION

The present invention solves the problem above described, and the object is to provide a coating composition having excellent curability and excellent storage stability, which provides a cured film having good weather resistance, particularly excellent acid resistance. The present invention also provides a process for forming a cured film and a coated article using the coating composition.

The present invention provides a liquid coating composition comprising:

(a) a compound having at least 2 carboxyl groups;
(b) a compound having at least 2 epoxy groups; and
(c) 0.01 to 3.0 parts by weight based on 100 parts by weight of the total resin solid of an onium salt.

The coating composition of the present invention is suitably used for a clear coating composition. The present coating composition is useful for coating any conventional coated or uncoated substrate. For example, the present coating composition may be employed for coating a pre-coated surface, as for what we call top coating composition. The pre-coated surface include, for example, a surface coated by cured or uncured solid colored film and a surface coated by cured or uncured composite film.

The present invention also provides a process for forming a cured film on a substrate comprising:

priming and/or intercoating the substrate;
applying a water-borne or solvent-borne color base paint to a primed and/or intercoated surface of the substrate;
applying a clear coating composition to a base coated surface of the substrate without curing a base coating layer; and
baking both the base coating layer and the clear coating layer to cure;
an improvement being present in that the clear coating composition comprises the coating composition described above.

DESCRIPTION OF THE INVENTION

The present invention provides a liquid coating composition comprising:

(a) a compound having at least 2 carboxyl groups;
(b) a compound having at least 2 epoxy groups; and
(c) 0.01 to 3.0 parts by weight based on 100 parts by weight of the total resin solid of an onium salt.

Preferably, the present coating composition further comprises 0.01 to 6.0 parts by weight based on 100 parts by weight of the total resin solid of a metal salt of organic sulfonic acid (d).

The compound having at least 2 carboxyl groups (a) employed in the present coating composition is not particularly limited, and may be any compound having an average of at least 2 carboxyl groups per molecule. Examples of preferred polymer (a) include a polymer having carboxyl groups (a") which has an acid value of from 30 to 300 mgKOH/g solid and a number average molecular weight of 500 to 50000.

Preferred polymer (a") includes an acrylic polymer having carboxyl groups (a"1) and a polyester polymer having carboxyl groups (a"2). The acrylic polymer having carboxyl groups (a"1) is particularly preferred, because the resulting cured film has excellent weather resistance. The acrylic polymer having carboxyl groups (a"1) may be prepared by copolymerizing 3.5 to 90%, preferably 7 to 60%, more preferably 10 to 50% by weight of an ethylenically unsaturated monomer (Hereinafter, the wording "monomer" means "ethylenically unsaturated monomer".) having a carboxyl group (a"1)(1), and 96.5 to 10%, preferably 93 to 40%, more preferably 90 to 50% by weight of a monomer (a"1) (4) which is different from (a"1)(1). If the amount of the monomer (a"1) is less than 3.5% by weight, curability of the resulting coating composition becomes poor, and if more than 90% by weight, the resulting cured film becomes too hard and brittle and it provides poor weather resistance.

The copolymerization may be conducted by the usual solution polymerization, for example, under the condition of normal or elevated pressure for 3 to 10 hours of reaction time at a temperature of 80° to 200° C. by radical polymerization initiated by azo compounds or peroxides in an amount of 0.5 to 15% by weight based on the total monomer weight. In the polymerization, an additive, such as a chain transfer agent and an anti-oxidant may be employed.

Examples of the monomer having a carboxyl group (a"1)(1) include acrylic acid, methacrylic acid, itaconic acid and maleic acid and the like. These may be employed in alone or in combination of at least two.

Preferred monomer (a")(1) is a long-chain monomer having a terminal carboxyl group (a"1)(1') which contains more than 6 carbon and/or oxygen atoms between an ethylenically unsaturated group and a carboxylic group. Such a monomer may impart mar resistance to the resulting cured film.

The monomer (a"1)(1') can be prepared, for example, by half-esterifying a monomer having a hydroxyl group (a"1) (2) of the formula:

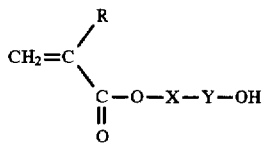 (I)

wherein, R represents a hydrogen atom or a methyl group, X represents a linear or branched alkylene group having 2 to 8 carbon atoms, and Y represents an organic chain of the formula:

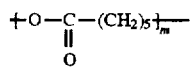

wherein, m represents an integer of 0 to 5, or of the formula:

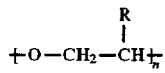

wherein, R represents an hydrogen atom or a methyl group, and n represents an integer of 1 to 50; with a compound having an anhydride group.

Examples of the monomer (a"1)(2) of the formula (I) include 2-hydroxyethyl (meth)acrylate, 2-hydroxypropyl (meth)acrylate, 4-hydroxybutyl (meth)acrylate, 2-hydroxybutyl (meth)acrylate, and ε-caprolactone reactants thereof (For example, "Placcel FM-1", "Placcel FA-1" and "Placcel FA-2" which are commercially available from Daicel Chemical Industries, Ltd), mono(meth)acrylate ester of polyethylene glycol, polypropylene glycol or 1,6-hexane diol.

The compound having an anhydride group employed in the present invention may be any compound which provides a carboxyl functionality by half-esterifying with a hydroxyl group under usual reaction condition such as a temperature of from room temperature to 150° C. and normal pressures. The compound having an anhydride group has preferably 8 to 12, more preferably 8 to 10 carbon atoms, and preferably has saturated or unsaturated cyclic group, because such a compound may impart improved compatibility to the resulting polymer. Specific examples of the compound having an anhydride group include hexahydrophthalic anhydride, phthalic anhydride, 4-methylhexahydrophthalic anhydride, tetrahydrophthalic anhydride and trimellitic anhydride.

The half-esterification reaction is carried out according to any process known to the art, for example, at a temperature of from room temperature to 150° C. It is preferred in the reaction that an excess amount of the monomer having a hydroxyl group (a"1)(2) is employed in order not to leave unreacted anhydride group.

The monomer (a"1)(1') may be employed in an amount of 3.5 to 90%, preferably 7 to 60% by weight, more preferably 10 to 50% by weight based on the total weight of monomers for the acrylic polymer having carboxyl groups (a"1). If the amount of the monomer (a"1)(1') is less than 3.5% by weight, curability of the resulting coating composition becomes poor, and if more than 90% by weight, flexibility of the resulting cured film may become poor.

The other preferred monomer (a"1)(1) is an ethylenically unsaturated monomer having a carboxyl group and a carboxylate group, which is prepared by half-esterifying a monomer having an anhydride group (a"1)(3) with a monoalcohol.

Specific examples of the monomer having an anhydride group (a"1)(3) include itaconic anhydride, maleic anhydride and citraconic anhydride.

Typical examples of the monoalcohol include methanol, ethanol, n-propanol, isopropanol, n-butanol, isobutanol, t-butanol, n-hexyl alcohol, lauryl alcohol, methoxypropanol, acetol, allyl alcohol, propargyl alcohol and furfuryl alcohol. Dimethylamino ethanol, diethylamino ethanol, ethylene glycol monomethyl ether, ethylene glycol monoethyl ether, ethylene glycol monobutyl ether and polyalkylene glycol monoalkyl ether may also be employed.

The monomer (a"1)(1) may be employed in an amount of 3.5 to 90%, preferably 7 to 60% by weight, more preferably 10 to 50% by weight based on the total weight of monomers for the acrylic polymer (a"1) component. If the amount of the monomer (a"1)(1) is less than 3.5% by weight, curability of the resulting coating composition becomes poor, and if more than 90% by weight, the resulting cured film becomes too hard and brittle and it provides poor weather resistance.

The monomer (a"1)(4) which is different from (a"1)(1) may be any monomer which is compatible with a carboxylic group. For example, the monomer having a hydroxyl group (a"1)(2) may be employed as the monomer (a"1)(4).

For example, 5 to 90% by weight of the monomer having a carboxylic group (a"1)(1), and 95 to 10% by weight of the monomer having hydroxyl group (a"1)(2), and and 0 to 60% by weight of the monomer (a"1)(6) which is different from (a"1)(1) and (a"1)(2) may be copolymerized to prepare a polymer having carboxyl groups and hydroxyl groups (a"1') which is particularly preferred for employing in the present coating composition.

The polymer (a"1') has an acid value of 30 to 300 mgKOH/g solid, preferably 60 to 180 mgKOH/g solid, a hydroxyl equivalent weight of 350 to 1200, preferably 400 to 1000, and an number average molecular weight of 1000 to 8000, preferably 1500 to 6000.

In preparation of the polymer (a"1'), it is preferred to employ as the monomer (a"1)(2), a long-chain monomer having a terminal hydroxyl group (a"1)(2') which contains more than 6 carbon and/or oxygen atoms between an ethylenically unsaturated group and a hydroxyl group. Such a monomer may impart mar resistance to the resulting cured film.

Specific examples of the long-chain monomer having a terminal hydroxyl group (a"1)(2') include 4-hydroxybutyl (meth)acrylate, an ε-caprolactone adduct of monomer (a"1) (2) (for example, "Placcel FM-1", "Placcel FA-1" and "Placcel FM-2" and the like), mono(meth)acrylate ester of polyethylene glycol, polypropylene glycol or 1,6-hexane diol.

The acrylic polymer having carboxyl groups (a"1) employed in the present invention may also be prepared by the method that copolymerizing the monomer having a hydroxyl group (a"1)(2) and the monomer which is different from (a"1)(2), and half-esterifying the resulting polymer with the compound having an anhydride group.

The acrylic polymer having carboxyl groups (a"1) employed in the present invention may also be prepared by the method that copolymerizing the monomer having an anhydride group (a"1)(3) and a monomer (a"1)(5) which is different from monomer (a"1)(3), and half-esterifying the resulting polymer with a monoalcohol.

For example, a polymer having anhydride groups is prepared by copolymerizing 10 to 40% by weight of the monomer having an anhydride group (a"1)(3) and 60 to 90% by weight of the monomer (a"1)(5) which is different from (a"1)(3). If the amount of the monomer (a"1)(3) is less than 10% by weight, curability of the resulting coating composition becomes poor, and if more than 40% by weight, the resulting cured film becomes too hard and brittle and it provides poor weather resistance.

The polymer having anhydride groups prepared by the copolymerization has preferably an average of at least 2 anhydride group per molecule, more preferably average 2 to 15 anhydride groups. If the number of the anhydride group is less than 2, curability of the resulting coating composition becomes poor, and if more than 15, the resulting cured film becomes too hard and brittle and it provides poor weather resistance.

The monomer (a"1)(5) which is different from (a"1)(3) may be any monomer which is compatible with the anhydride group.

An acrylic polymer having carboxyl groups and carboxylate groups (a"1") is then prepared by half-esterifying the resulting polymer with an excess amount of monoalcohol, preferably in an molar ratio of the the anhydride group to hydroxyl group of 1/10 to 1/1. If the molar ratio is more than 1, unreacted anhydride group remains into the composition and storage stability of the composition becomes poor.

Since half-esterification reaction may be conducted at lower temperature compared with polymerization reaction, the methods above described are useful when the compound having an anhydride group or a monoalcohol has low sublimation point or low boiling point.

The monoalcohol employed in the methods above described has 1 to 12, preferably 1 to 8 carbon atoms. These alcohols easily volatile upon heating, and conveniently regenerates an anhydride group. Typical examples of the monoalcohol include methanol, ethanol, n-propanol, isopropanol, n-butanol, isobutanol, t-butyl alcohol, n-hexyl alcohol, methoxypropanol, dimethylamino ethanol, diethylamino ethanol, acetol, allyl alcohol, propargyl alcohol and furfuryl alcohol. Ethylene glycol monomethyl ether and ethylene glycol monoethyl ether may also be employed. Particularly preferred are methanol, ethanol, acetol, propargyl alcohol, allyl alcohol and furfuryl alcohol.

The acrylic polymer having carboxyl groups (a"1) employed in the present invention may be prepared by the method that copolymerizing the monomer having a carboxyl group (a"1)(1), the monomer having an anhydride group (a"1) (3) and a monomer (a"1)(7) which is different from (a"1)(1) and (a"1)(3), and half-esterifying the resulting polymer with a monoalcohol.

For example, an acrylic polymer having carboxyl groups and carboxylate groups (a"1'") may be prepared by half-esterifying a polymer having anhydride groups which is prepared by copolymerizing 3.5 to 45% by weight of the monomer having a carboxyl group (a"1)(1), 10 to 40% by weight of the monomer having an anhydride group (a"1)(3) and remainder amount of the monomer (a"1)(7) which is different from (a"1)(1) and (a"1)(3), with a monoalcohol in an molar ratio of the anhydride group to the hydroxyl group of 1/10 to 1/1.

In preparation of the polymers, it is particularly preferred to employ a long-chain monomer having a terminal carboxyl group (a"1)(1') as the monomer (a"1)(1). Such a monomer may impart mar resistance to the resulting cured film.

The monomer (a"1)(4) which is different from (a"1)(1), the monomer (a")(5) which is different from (a"1)(3), the monomer (a"1)(6) which is different from (a"1)(1) and (a"1) (2) and the monomer (a"1)(7) which is different from (a"1)(1) and (a"1)(3) are not particularly limited. A monomer having one ethylenically unsaturation and 3 to 15, particularly 4 to 12 carbon atoms is generally employed. More than two monomers may also be employed in combination in order to improve compatibility of the polymers each other.

Specific examples of the monomer include (meth)acrylates such as methyl (meth)acrylate, ethyl (meth)acrylate, propyl (meth)acrylate, n-butyl (meth)acrylate, isobutyl (meth)acrylate, 2-ethylhexyl (meth)acrylate, lauryl (meth)acrylate and isobornyl (meth)acrylate; the monomer having a hydroxyl group (a"1)(2); stylene derivatives such as stylene, p-methylstylene, α-methylstyrene, p-t-butylstylene; vinyl esters such as vinyl acetate, "Veova-9" and "Veova-10" available from Shell Chemical Co.; dimethylaminomethyl methacrylate; (meth)acrylonitrile; and (meth)acrylamide. These may be employed in alone or in combination of at least two.

It is preferred that (meth)acrylates alone or a combination of at least 50% by weight of (meth)acrylates with the other monomer is employed as the monomer (a"1)(4) which is different from (a"1)(1), in order to improve durability and clarity of the cured film. When stylene or stylene derivatives are employed, an amount of not more than 40% by weight is preferred, in order to improve weather resistance of the cured film.

The acrylic polymer having carboxyl groups (a"1) preferably has an acid value of from 30 to 300 mgKOH/g solid, preferably 60 to 250 mgKOH/g solid, more preferably 90 to 200 mgKOH/g solid, number average molecular weight of from 500 to 50000, preferably 1000 to 20000, more preferably 1500 to 10000. If the acid value is less than 30 mgKOH/g solid, curability of the resulting coating composition becomes poor, and if more than 300 mgKOH/g solid, water resistance of the cured film becomes poor. If the molecular weight is less than 500, curability of the resulting composition becomes poor, and if more than 50000, viscosity of the resulting polymer becomes too high and workability becomes poor.

A combination of plurality of compounds having carboxyl groups (a) may be employed in the present coating composition.

Examples of the preferred is a combination of:

(a"1") an acrylic polymer having carboxyl groups and carboxylate groups, and having an acid value of 30 to 250 mgKOH/g solid and number average molecular weight of 500 to 20000, wherein the polymer (a"1") is prepared by half-esterifying the polymer having anhydride groups which is prepared by copolymerizing 10 to 40% by weight of a monomer having an anhydride group (a"1)(3) and 60 to 90% by weight of a monomer (a"1)(5) which is different from (a"1)(3), with a monoalcohol in an molar ratio of the anhydride group to the hydroxyl group of 1/10 to 1/1; with (a"1') an acrylic polymer having carboxyl groups and hydroxyl groups, and having an acid value of 30 to 300 mgKOH/g solid, a hydroxyl equivalent weight of 350 to 1200 and a number average molecular weight of 1000 to 8000, wherein the polymer (a"1') is prepared by copolymerizing 5 to 90% by weight of a monomer having a carboxyl group (a"1) (1), 95 to 10% by weight of a monomer having hydroxyl groups (a"1)(2) and 0 to 60% by weight of a monomer (a"1)(6) which is different from (a"1)(1) and (a"1)(2).

The other preferred examples of polymer having at least 2 carboxyl groups (a") include polyester polymer having at least 2 carboxyl groups (a"2). The polyester polymer having carboxyl groups (a"2) may be prepared by condensing polybasic acid with polyhydric alcohol.

Examples of the polybasic acid include dibasic acids such as phthalic acid, isophthalic acid, terephthalic acid, succinic acid, adipic acid, azelaic acid, sebacic acid, tetrahydrophthalic acid, hexahydrophthalic acid, maleic acid and fumaric acid; and anhydrides such as maleic anhydride, phthalic anhydride, succinic anhydride, tetrahydrophthalic anhydride, himic anhydride, trimellitic anhydride, methylcyclohexene tricarboxylic anhydride and pyromellitic anhydride. Acid components other than polybasic acid such as acetic acid, 2-ethylhexanoic acid, benzoic acid, p-t-butylbenzoic acid and fatty acids may be employed for modification.

Examples of polyhydric alcohol include ethylene glycol, propylene glycol, 1,3-butylene glycol, 1,6-hexane diol, diethylene glycol, dipropylene glycol, neopentyl glycol, hydroxypivalyl neopentyl glycol ester, hydrogenated bisphenol A, glycerol, trimethylol propane, trimethylol ethane, ditrimethylol propane, pentaerythritol and dipentaerythritol. A compound having epoxy group such as "Cardula E-10" (manufactured by Shell Chemical Co.) may also be employed in the same manner as the polyhydric alcohol.

The polyester polymer having carboxyl groups (a"2) may be modified by the use of fats and oils such as castor oil, china wood oil, tall oil, coconut oil, safflower oil, soybean oil and dehydrated castor oil.

The polyester polymer having carboxyl groups (a"2) preferably has an acid value of from 30 to 300 mgKOH/g solid, preferably 60 to 260 mgKOH/g solid, more preferably 90 to 230 mgKOH/g solid, number average molecular weight of from 500 to 50000, preferably 600 to 10000, more preferably 700 to 6000. If the acid value is less than 30 mgKOH/g solid, curability of the resulting coating composition becomes poor, and if more than 300 mgKOH/g solid, water resistance of the cured film becomes poor. If the molecular weight is less than 500, curability of the resulting composition becomes poor, and if more than 50000, viscosity of the resulting polymer becomes too high and workability becomes poor.

A compound having at least 2 epoxy groups (b) employed in the present coating composition is not particularly limited, and may be any compound having an average of at least 2 epoxy groups per molecule.

Preferred compound (b) has 2 to 10, more preferably 3 to 8 epoxy groups per molecule, and has an epoxy equivalent weight of 280 to 900, more preferably 300 to 800. If the epoxy equivalent weight is more than 900, curability of the resulting coating composition becomes poor, and if less than 280, the resulting cured film becomes too hard and brittle and it provides poor weather resistance.

The compound (b) has a number average molecular weight of 500 to 50000, preferably 700 to 15000, more preferably 1000 to 6000. If the molecular weight is more than 50000, viscosity of the resulting polymer becomes too high and workability becomes poor, and if less than 500, curability of the resulting coating composition becomes poor.

Preferred compound (b) employed in the present coating composition is selected from the group consisting of an acrylic polymer having epoxy groups (b1), a glycidyl ether of polyhydric alcohol (b2) and a glycidyl ester of polybasic acid (b3). More preferably, the compound (b) is the acrylic polymer having at least 2 epoxy groups (b1).

The polymer (b1) may be prepared by copolymerizing 10 to 60% by weight of the monomer having an epoxy group (b1)(1) and 90 to 40% by weight of a monomer (b1)(3) which is different from (b1)(1) according to the procedure known to the art. If the amount of the monomer (b1)(1) is less than 10% by weight, curability of the resulting coating composition becomes poor, and if more than 60% by weight, the resulting cured film becomes too hard and brittle and it provides poor weather resistance.

Specific examples of the monomer having an epoxy group (b1)(1) include glycidyl (meth)acrylate, β-methylglycidyl (meth)acrylate and 3,4-epoxycyclohexanylmethyl (meth)acrylate. In view of the balance of curability and storage stability, glycidyl (meth)acrylate is particularly preferred.

As the monomer (b1)(3) which is different from (b1)(1), the same monomer as the monomer (a"1)(4) which is described for preparing acrylic polymer having carboxyl groups (a"1) may be employed.

It is preferred that the monomer having a hydroxyl group (b1)(2) is employed as the monomer (b1)(3) to prepare an acrylic polymer having epoxy groups and hydroxyl groups (b1'). Adhesion of the resulting cured film may be improved by employing such a polymer. As the monomer (b1)(2), the same monomers which are described above as monomer (a"1)(2) are employed.

The monomer having a hydroxyl group (b1)(2) is preferably employed in an amount of from 5 to 60% by weight. If the amount is less than 5% by weight, the effect above described becomes poor, and if more than 60% by weight, compatibility of the resulting polymer becomes poor and reaction may progress incompletely. The polymer (b1') preferably has an average of 2 to 12, more preferably 4 to 10 hydroxyl groups per molecule.

The polymer (b1') has a hydroxyl equivalent weight of 280 to 1200, preferably 350 to 800 in addition to the epoxy equivalent weight above described. If the hydroxyl equivalent weight is less than 280, water resistance of the cured film becomes poor, and if more than 1200, the effect above described becomes poor.

It is preferred that the acrylic polymer having epoxy groups and hydroxyl groups (b1') is employed in the present coating composition in combination with the acrylic polymer having carboxyl groups and carboxylate groups (a"1") or (a"1'"). In the curing system, anhydride groups are regenerated in the polymer (a"1") or (a"1'") upon heating, they reacts with hydroxyl group present in the polymer (b1'), and thereby tough cured film is provided.

The other preferred examples of the compound having at least 2 epoxy groups (b) include the glycidyl ether of polyhydric alcohol (b2) and a glycidyl ester of polybasic acid (b3).

Examples thereof include glycerin triglycidyl ether, trimethylolpropane diglycidyl ether, trimethylolpropane triglycidyl ether, pentaerythritol pentaglycidyl ether, pentaerythritol triglycidyl ether, sorbitol hexaglycidyl ether and diglycidyl hexahydrophthalate ester. Among them, those having hydroxyl group therein such as trimethylolpropane diglycidyl ether and pentaerythritol triglycidyl ether are able to achieve the same effect as the acrylic polymer having epoxy groups and hydroxyl groups (b1).

In the present coating composition, the onium salt (c) and optionally the metal salt of organic sulfonic acid (d) are included in order to achieve the effect of excellent curability and storage stability.

The onium salt (c) may be employed in an amount of from 0.01 to 3 parts by weight, preferably 0.05 to 1.5 parts by weight, more preferably 0.1 to 1.2 parts by weight based on 100 parts of the total resin solid of the compound having at least 2 carboxyl groups (a) and the compound having at least 2 epoxy groups (b). If the amount of the onium salt (c) is less than 0.01 parts by weight, curability of the resulting coating composition becomes poor, and if more than 3.0 parts by weight, storage stability becomes poor.

The metal salt of organic sulfonic acid (d) may optionally be included in the present coating composition. It may be employed in an amount of from 0.01 to 6.0 parts by weight, preferably 0.05 to 4.0 parts by weight, more preferably 0.1 to 3.0 parts by weight based on 100 parts of the total resin solid of the compound having at least 2 carboxyl groups (a) and the compound having at least 2 epoxy groups (b). If the amount of the metal salt of organic sulfonic acid (d) is less than 0.01 parts by weight, storage stability of the composition becomes poor, and if more than 6.0 parts by weight, water resistance and weather resistance of the resulting cured film becomes poor and the film tend to become yellow.

The onium salt (c) is a compound of the formula:

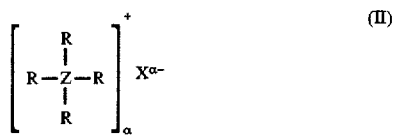

wherein, Z represent a nitrogen atom or a phosphorus atom. R each independently represents an alkyl group having 1 to 20 carbon atoms, a cyclic alkyl group having 6 to 10 carbon atoms, an aryl group having 5 to 8 carbon atoms, an aralkyl group having 6 to 10 carbon atoms or a moiety which complete together with at least two of them a saturated or unsaturated heterocyclic ring comprising a nitrogen atom. R may have at least one halogen, nitrogen or oxygen atoms. α represents an integer of 1 to 3.

X represents a halide ion, an organic carboxylate ion, a nitrate ion, a nitrite ion, an acidic phosphate ion of the formula:

or a phosphonate ion of the formula:

wherein, R represents each independently an alkyl group having 1 to 20 carbon atoms, preferably 2 to 12 carbon atoms, a cycloalkyl group having 6 to 10 carbon atoms, an aryl group having 5 to 8 carbon atoms or an aralkyl group having 6 to 10 carbon atoms. If the number of carbon atoms included by R is too small, water resistance of the resulting cured film becomes poor, and if too large, compatibility of the resulting polymer becomes poor. R may have at least one halogen, nitrogen or oxygen atoms. n represents 1 to 3.

Examples of a cationic part of the onium salt (c) include tetramethylammonium, tetraethylammonium, tetrapropylammonium, tetrabutylammonium, trimethylbenzylamnonium, trimethylisobutylammonium, trimethylhexylammonium, trimethyldecylammonium, trimethyllaurylammonium, trimethylcetylammonium, trimethylstearylammonium, trimethylbenzylammonium, triethylbenzylammonium, tetramethylphosphonium, tetraethylphosphonium, tetrabutylphosphonium, trimethylbenzylphosphonium, tributyloctylphosphonium, tributylhexadecylphosphonium and tributylbenzylphosphonium.

Examples of an anionic part of the onium salt (c) include bromide, fluoride, chloride, salicylate, glycolate, 2-ethylhexanoate, nitrite, nitrate, methylphosphate, ethylphosphate, propylphosphate, butylphosphate, hexylphosphate, 2-ethylhexylphosphate, isodecylphosphate, laurylphosphate, phenylphosphate, dibutylphosphate, dihexylphosphate, di-2-ethylhexylphosphate, dilaurylphosphate, diphenylphosphate, butylphosphate, 2-ethylhexylphosphonate, dibutylphosphonate, di-2-ethylhexylphosphonate and o,o'-diethylphosphorodithioate.

The cationic part and the anionic part may be combined suitably to provide the onium salt (c) of the present invention. Specific examples of the onium salt (c) include tetrabutylphosphonium diethylphosphorodithioate, tetrabutylammonium nitrate, tetrabutylammonium nitrite, tetrabutylammonium dibutylphosphate, trimethylbenzylammonium nitrate, trimethylbenzylammonium dibutylphosphate, trimethylbenzylammonium di-2-ethylhexylphosphate, trimethylcetylammonium dibutylphosphate, trimethylcetylammonium butylphosphonate, tetrabutylphosphonium dibutylphosphate, tetrabutylammonium di-2-ethylhexylphosphate, bis-trimethylbenzylammonium n-butylphosphate, tetraethylphosphonium diethylphosphorodithioate, tributylbenzylphosphonium bromide, trimethylcetylammonium 2-ethylhexylphosphate. Other examples of the onium salt (c) include trimethylbenzylammonium bromide, trimethylbenzylammonium chloride, trimethylbenzylammonium salicylate, trimethylbenzylammonium glycolate, trimethylbenzylammonium paratoluenesulfonate, tetrabutylammonium bromide, tetrabutylammonium chloride, tetrabutylammonium salicylate, tetrabutylammonium glycolate, tetrabutylammonium paratoluenesulfonate, trimethylbenzylammonium bromide and tributylbenzylphosphonium bromide.

The onium salt (c) may be employed in alone or in combination of at least two.

It is preferred to employ a nitrite ion, a nitrate ion, an acidic phosphate ion, or a phosphonate ion as the anionic part, in view of the balance between storage stability and curability of the coating composition.

The metal salt of organic sulfonic acid (d) is preferably a salt of an alkyl sulfonic acid or an alkyl substituted aromatic sulfonic acid with metal which is present in from the third to the fifth period and from II to VIII group of the periodic table.

For example, magnesium diparatoluenesulfonate, magnesium didodecylbenzenesulfonate, magnesium dinonylnaphthalenesulfonate, zinc diparatoluenesulfonate, zinc didodecylbenzenesulfonate, di-n-butyltin didodecylbenzenesulfonate and di-n-butyltin diparatoluenesulfonate. Particularly preferred are di-n-butyltin didodecylbenzenesulfonate, di-n-butyltin diparatoluenesulfonate, magnesium didodecylbenzenesulfonate, zinc didodecylbenzenesulfonate and tetrabutyldistannoxane didodecylbenzenesulfonate. These have good compatibility with resin, and stable in the coating composition.

The coating composition of the present invention is prepared by mixing the compound having at least 2 carboxyl groups (a); the compound having at least 2 epoxy groups (b); 0.01 to 3 parts by weight based on 100 parts of the total resin solid of the onium salt (c); and optionally 0.01 to 6.0 parts by weight based on 100 parts of the total resin solid of the metal salt of organic sulfonic acid (d).

The preparation may be made in such an amount that a molar ratio of the carboxyl group in the polymer (a) to the epoxy group in the polymer (b) is within the range of 1/1.2 to 1/0.6, preferably 1/1.1 to 1/0.8. If the compound (a) has carboxylate group and the compound (b) has hydroxyl groups, the composition preferably further satisfy the condition that a molar ratio of carboxylate group in the compound (a) to hydroxyl group in the compound (b) is within the range of 1/1.5 to 1/0.2, preferably 1/1.2 to 1/0.4.

If the molar ratio of the carboxyl group to the epoxy group is more than 1/0.6, curability of the resulting resin composition becomes poor, and if less than 1/1.2, the cured film becomes yellow.

The above mentioned molar ratios can be specifically calculated by the methods known to the art from hydroxyl value, acid value and epoxy equivalent depending on the employed polymers.

It is preferred that the coating composition of the present invention contains 10 to 80%, preferably 30 to 70% by weight of the compound (a), and 20 to 90%, preferably 30 to 70% by weight of the compound (b). If the amount of the compound (a) is more than 80% by weight, the resulting cured film becomes too soft and acid resistance of the film becomes poor. If the amount is less than 10% by weight, mar resistance of the resulting cured film becomes poor.

The present coating composition may also contain melamine-formaldehyde resin and/or blocked isocyanate, in order to enhance crosslinking density and water resistance. Further, a UV absorber, a hindered amine light stabilizer and anti oxidant may be added to enhance weather resistance. The composition may also contain other additives, such as rheology controlling agent (e.g. crosslinked resin particles), surface controlling agent. In order to adjust viscosity of the resin composition, a diluent (e.g. alcohols, such as methanol, ethanol, propanol and butanol; hydrocarbon; esters) may be added thereto.

The resin composition has carboxyl groups which are neutralized with amine to make the composition water-dispersible or water-soluble. The resin composition may be formed into aqueous resin composition.

The coating composition of the present invention is suitably used for a clear coating composition. The present coating composition is useful for coating any conventional coated or uncoated substrate. For example, the present coating composition may be employed for coating a pre-coated surface, as what we call top coating composition. The pre-coated surface include, for example, a surface coated by cured or uncured solid colored film and a surface coated by cured or uncured composite film.

The clear coating composition is generally applied on a base coating layer formed from a base coating composition which is either aqueous or solvent-borne and contains color pigment. It is also preferred that the clear coating composition is applied on the base coating layer without curing the base coating layer and then the composite layer is baked to cure (two-coat one-bake curing system).

In case where the aqueous base coating composition is employed in the two-coat one-bake system, the base coating layer, if necessary, is heated at 60° to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The coating composition may be prepared by art-known methods, for example as enamel paint mixing ingredients by kneader or roll.

The resin composition may be applied on a substrate by spraying, brushing, dipping, roll coating, flow coating, rotary atomizing and the like. The substrate can be any one, including wood, metal, glass, fabric, plastics, plastic foam and the like. Preferred are plastics, metals (e.g. steel and aluminum) and alloys thereof. The substrate may be primed or intercoated by art-known methods if necessary.

The film thickness of the resulting coating layer may be varied depending upon its usage, but in many cases within the range of 20 to 100 μm.

The coated coating layer is generally cured by heating at a temperature of 100° to 180° C., preferably 120° to 160° C. Curing time may be varied by curing temperature, but generally for 10 to 30 minutes at a temperature of 120° to 160° C.

EXAMPLES

The present invention is illustrated by the following Examples which, however, are not to be construed as limiting the present invention to their details. The amounts expressed herein by "parts" or "%" is based on weight, unless otherwise indicated.

Preparative Example 1

A reaction vessel equipped with a thermometer, a stirrer, a cooling tube, a nitrogen inlet tube and a dropping funnel was charged with 360 parts of Arco Solve PMA (An organic solvent available from Kyowa Yuka K.K.), 777 parts of 4-hydroxybutyl acrylate, 820 parts of hexahydrophthalic anhydride and 0.48 parts of hydroquinone monomethyl ether. A temperature of the content was raised to 145° C. and stirred over 20 minutes. The reaction mixture was then cooled and evacuated from the vessel to provide the monomer containing a carboxyl group i.

A reaction vessel equipped with a thermometer, a stirrer, a cooling tube, a nitrogen inlet tube and a dropping funnel was charged with 300 parts of xylene and 200 parts of Arco Solve PMA, and a temperature of the content was raised to 130° C. To the reaction vessel was dropwise added over 3 hours a solution of monomer and initiator consisting of 500 parts of the monomer containing a carboxyl group i, 100 parts of styrene, 200 parts of n-butyl acrylate and 50 parts of t-butyl-peroxy-2-ethylhexanoate. The content was stirred for 30 minutes at 130° C., and was dropwise added over 30 minutes a solution consisting of 10 parts of t-butyl-peroxy-2-ethylhexanoate and 100 parts of xylene. The content was stirred for 30 minutes at 130° C. and cooled to provide a clear solution containing the acrylic polymer having carboxyl groups I, having a solid content of 50%. The resulting polymer I had a number average molecular weight of 4000 and an acid value of 108 mgKOH/g solid.

Preparative Example 2

A reaction vessel equipped with a thermometer, a stirrer, a cooling tube, a nitrogen inlet tube and a dropping funnel was charged with 80 parts of xylene and heated to 115° C. To the reaction vessel was dropwise added over 3 hours a solution of monomer and initiator consisting of 25 parts of styrene, 21 parts of n-butyl acrylate, 95 parts of n-butyl methacrylate, 34 parts of 2-ethylhexyl methacrylate, 50 parts of maleic anhydride, 100 parts of propylene glycol monomethyl ether acetate and 10 parts of t-butyl-peroxy-2-ethylhexanoate. The content was stirred for 2 hours and cooled to provide a clear solution containing the acrylic polymer having anhydride groups ii, having a solid content of 53%. The resulting polymer ii had a number average molecular weight of 5500.

A reaction vessel was added 415 parts of the resulting solution and 24.5 parts of methanol, and a temperature of the content was raised to 65° C. and stirred for 24 hours to provide a clear solution containing the acrylic polymer having carboxyl groups and carboxylate groups II. An absorption due to an anhydride group (1785 cm⁻) was disappeared under analysis of infrared absorption spectra. The polymer II had an acid value of 127 mgKOH/g solid.

Preparative Example 3

A reaction vessel equipped with a thermometer, a stirrer, a cooling tube, a nitrogen inlet tube and a dropping funnel was charged with 400 parts of trimethylol propane, 130 parts of xylene and 123 parts of hexahydrophthalic anhydride. The content was stirred for 60 minutes at 130° C. to provide a clear solution containing the polyester polymer having carboxyl groups III, having a solid content of 80% by weight. An absorption due to an anhydride group (1785 cm⁻) was disappeared under analysis of infrared absorption spectra. The polymer III had an acid value of 86 mgKOH/g solid.

Preparative Example 4

A reaction vessel equipped with a thermometer, a stirrer, a cooling tube, a nitrogen inlet tube and a dropping funnel was charged with 500 parts of butyl acetate and heated to 125° C. To the reaction vessel was dropwise added over 3 hours a solution of monomer and initiator consisting of 50 parts of stylene, 400 parts of glycidyl methacrylate, 350 parts of n-butyl methacrylate, 200 parts of 2-ethylhexyl acrylate and 70 parts of t-butyl-peroxy-2-ethylhexanoate. The content was stirred for 30 minutes at 125° C., and was dropwise added over 30 minutes a solution consisting of 10 parts of t-butyl-peroxy-2-ethylhexanoate and 250 parts of xylene. The content was stirred for 2 hours at 125° C. and cooled to provide a clear solution containing the acrylic polymer having epoxy groups IV, having a solid content of 59%. The resulting polymer IV had a number average molecular weight of 4000 and an epoxy equivalent weight of 355.

Preparative Example 5

The acrylic polymer having hydroxyl groups and epoxy groups V were prepared according to the procedure described for preparative example 4, except using the ingredients tabulated in the following Table 1. Property of the resulting polymer is also indicated below.

TABLE 1

| No. of obtained polymer | V |
| --- | --- |
| Precharged solvent (amount) | xylene (450) |
| | n-butanol (50) |
| Stylene | 220 |
| Glycidyl methacrylate | 320 |
| 4-Hydroxybutyl methacrylate | 220 |
| 2-Ethylhexyl acrylate | 240 |
| t-Butyl-peroxy-2-ethylhexanoate | 50 |
| Xylene | 250 |
| Epoxy equivalent weight (g solid) | 444 |
| Hydroxy equivalent weight (g solid) | 650 |
| Number average molecular weight | 7000 |

Preparative Example 6

The monomer having a carboxyl group vi were prepared according to the procedure described for preparative example 1, except using the ingredients tabulated at "monomer composition" in the following Table 2. The acrylic polymer having hydroxyl groups and carboxyl groups VI was then prepared using the compositions tabulated at "polymer composition" in the following Table 2. A clear solution containing the polymer VI, having a solid content of 57% was obtained. The resulting polymer VI had a number average molecular weight of 2100, an acid value of 100 mgKOH/g solid and a hydroxy equivalent weight of 560.

TABLE 2

| Monomer composition No. of obtained monomer | vi |
| --- | --- |
| Arco Solve PMA | 376 |
| 4-Hydroxybutyl acrylate | 777 |
| 4-Methylhexahydrophthalic anhydride | 725 |
| Hydroquinone monomethyl ether | 0.5 |

TABLE 2-continued

| Polymer composition No. of obtained polymer | VI |
| --- | --- |
| Xylene | 250 |
| Arco Solve PMA | 250 |
| Monomer vi | 800 |
| Stylene | 200 |
| 4-Hydroxybutyl acrylate | 200 |
| t-Butyl-peroxy-2-ethylhexanoate | 100 |

Preparative Example 7

A reaction vessel equipped with a thermometer, a stirrer, a cooling tube, a nitrogen inlet tube and a dropping funnel was charged with 700 parts of xylene and 500 parts by weight of "Solvesso 100" (An aromatic hydrocarbon solvent available from Exxon Chemical1), and heated to 130° C. To the reaction vessel was dropwise added over 3 hours a solution of monomer and initiator consisting of 300 parts of stylene, 350 parts of 2-ethylhexyl acrylate, 150 parts of isobutyl methacrylate, 200 parts of acrylic acid, 150 parts of t-butyl-peroxy-2-ethylhexanoate and 300 parts of xylene. The content was stirred for 30 minutes at 130° C., and was dropwise added over 30 minutes a solution consisting of 20 parts of t-butyl-peroxy-2-ethylhexanoate and 20 parts of xylene. The content was stirred for 1 hours at 130° C. and evaporated 1100 parts of solvent to provide a clear solution containing the acrylic polymer having carboxyl groups VII, having a solid content of 70%. The resulting polymer VII had a number average molecular weight of 1800 and an acid value of 156 mgKOH/g solid.

Preparative Example 8

A reaction vessel equipped with a thermometer, a stirrer, a nitrogen inlet tube, water separator and a condenser was charged with 210 parts of isophthalic acid, 370 parts of azelaic acid, 400 parts of trimethylol propane, 100 parts of neopentyl glycol, 50 parts of Cardula E, and was mildly heated to melt the contents. To the reaction vessel was then added 0.2 parts of dibutyltin oxide with stirring, and was heated to 220° C. With the proviso, in the temperature range from 180° to 220° C., the reaction vessel was heated over 3 hours at a constant heating rate. The generated water was distilled out from the system. When the temperature reached 220° C., the reaction vessel was lagged for 1 hour, and to the reaction vessel was then slowly added 30 parts of xylene as a reflux solvent. The condensation reaction was continued in the presence of the solvent. When an acid value of the resin reached 10.0, the reaction vessel was cooled to 150° C., added 420 parts of phthalic anhydride, lagged for 1 hour, and cooled to 100° C. To the reaction vessel was added 275 parts of ethyl 3-ethoxypropionate and 275 parts of butyl acetate to provide a clear solution containing the polyester polymer having carboxyl groups VIII, having a solid content of 70%. The resulting polymer VIII had a number average molecular weight of 4200, a ratio of weight average molecular weight to number average molecular weight of 3.3, an acid value of 115 mgKOH/g solid.

Example 1

A resin composition was prepared by mixing the ingredients tabulated in the following table 3.

The resulting resin composition was then diluted with a solvent mixture of butyl acetate and xylene (1/1) to a coatable viscosity to obtain a clear coating composition. Storage stability of the coating composition was then evaluated according to the following "Methods for Evaluation", and the results obtained are shown in Table 5.

A phosphated steel panel was coated with Power Top U-30 (Electrodeposition paint available from Nippon Paint Co., Ltd.) and Orga P-2 (Intercoating paint available from Nippon Paint Co., Ltd.). The intercoated panel was then base-coated with a solvent-borne metallic base paint (Super Lack M-90 available from Nippon Paint Co., Ltd.) and then further coated with the above obtained clear coating composition in the form of wet-on-wet. The clear coated panel was baked at 140° C. for 30 minutes to obtain a cured film having a thickness of 40 μm.

The solvent-borne metallic base paint comprises 10.9 parts of aluminium pigment paste having an aluminium flake content of 65% ("Alpaste 7160N" available from Toyo Aluminium K.K.), 66.85 parts of thermocurable acrylic resin varnish having a solid content of 48% ("Almatex NT-U-448" available from Mitsui Toatsu Kagaku K.K.), 13.37 parts of melamine resin varnish having a solid content of 60% ("Uvan 20N-60" available from Mitsui Toatsu Kagaku K.K.), 6.38 parts of toluene, 2.0 parts of butanol and 0.5 parts of triethylamine.

The resulting cured film was evaluated as follows and the results obtained are shown in Table 5.

Methods for Evaluation

Storage stability: Viscosity of the coating composition was standardized to 30sec/20° C. of Ford cup No.4. The coating composition was then stored for 10 days at 40° C. Viscosity of the stored coating composition was measured at 20° C. by the use of Ford cup No.4 again. Increments of the viscosity represented by second was itself adopted as evaluation for storage stability of the coating composition.

Pencil hardness: The cured film was evaluated according to JIS K 5400-1979.

Warm water resistance: A cured film was dipped in warm water at 40° C. for 10 days and then its appearance was observed by visual inspection according to the following criteria.

|  |  |
|---|---|
| No change | ⊙ |
| Slightly changed | Δ |
| Changed | x |

Acid resistance: The cured film was contacted with 0.2 ml of a 0.1N $H_2SO_4$ aqueous solution at 60° C. for 2 hours and then observed by visual inspection according to the following criteria.

|  |  |
|---|---|
| No change | ⊙ |
| Slightly changed | o |
| Changed | Δ |
| Definitely changed | x |

Examples 2 to 13

Clear coating compositions were prepared as generally described in Example 1, except using the ingredients tabulated in the following Table 3, and the same evaluations as Example 1 were conducted. The results were shown in Table 5.

Example 14

In place of the metallic base of the example 1, the intercoated panel was base-coated with a water-borne metallic base paint (The paint is described in Example 1 of U.S. Pat. No. 5,183,504). After drying at 60° C. for 5 minutes, the panel was further coated with the clear coating composition of Example 1 in the form of wet-on-wet. The clear coated panel was baked at 140° C. for 30 minutes to obtain a cured film having a thickness of 40 μm. The same evaluations as Example 1 were conducted for the cured film. The results were shown in Table 5.

The water-borne metallic base paint comprises 15 parts of aluminium pigment paste having an aluminium flake content of 65% ("Alpaste 7160N" available from Toyo Aluminium K.K.), 30 parts of methyled melamine ("Cymel 303" available from Cytec Ind. Inc.), 2 parts of isostearic phosphate ("Phosphorex A-180L available from Sakai Kagaku K.K."), 112 parts of acrylic resin varnish prepared in preparative example 1 of the U.S. Pat. No. 5,183,504, having a number average molecular weight of 12000, a hydroxyl value of 70, an acid value of 58 and a solid content of 50%, and 43 parts of urethane emulsion having an acid value of 16.2 and a solid content of 33%.

Comparative Examples 1 to 4

A comparative clear coating composition was prepared as generally described in Example 1, except using the composition tabulated in the following Table 3, and the same evaluations as Example 1 were conducted. The results were shown in Table 5.

TABLE 3

| | Polymers having | | | | | | | | |
|---|---|---|---|---|---|---|---|---|---|
| Example no. | COOH | COOH, COOR | OH, COOH | epoxy group | Curing catalysts | | | | |
| 1 | I | — | — | IV | TBABr*1 | TBASA*2 | MgDBS*3 | T900*4 | T123*5 |
| | 200 | — | — | 115 | 0.3 | 0.6 | 1.0 | 2.0 | 1.0 |
| 2 | II | — | — | IV | TBABr | TBASA | MgDBS | T900 | T123 |
| | 200 | — | — | 140 | 0.3 | 0.6 | 1.0 | 2.0 | 1.0 |
| 3 | — | II | — | V | TBABr | TBASA | MgDBS | T900 | T123 |
| | — | 200 | — | 180 | 0.3 | 0.6 | 1.0 | 2.0 | 1.0 |
| 4 | — | II | VI | V | TBABr | TBASA | MgDBS | T900 | T123 |
| | — | 200 | 40 | 210 | 0.3 | 0.6 | 1.0 | 3.0 | 1.0 |
| 5 | — | II | VI | V | TBABr | TBASA | MgDBS | T900 | T123 |
| | — | 200 | 40 | 210 | 0.3 | 0.6 | 2.0 | 3.0 | 1.0 |
| 6 | I | — | — | IV | TBPPT*6 | | MgDBS | T900 | T123 |
| | 200 | — | — | 115 | 0.5 | | 1.0 | 2.0 | 1.0 |
| 7 | — | II | VI | V | TBPPT | | MgDBS | T900 | T123 |
| | — | 200 | 40 | 210 | 0.5 | | 1.0 | 3.0 | 1.0 |
| 8 | — | II | VI | V | TBPPT | | MgDBS | T900 | T123 |
| | — | 200 | 40 | 210 | 1.0 | | 1.0 | 3.0 | 1.0 |

TABLE 3-continued

| Example no. | Polymers having COOH | COOH, COOR | OH, COOH | epoxy group | Curing catalysts | | | | | |
|---|---|---|---|---|---|---|---|---|---|---|
| 9 | — | II | VI | V | TEPBr*7 | | MgDBS | | T900 | T123 |
|   | — | 200 | 40 | 210 | 1.0 | | 1.0 | | 3.0 | 1.0 |
| 10 | — | II | VI | V | TBPBr*8 | | MgDBS | | T900 | T123 |
|   | — | 200 | 40 | 210 | 1.0 | | 1.0 | | 3.0 | 1.0 |
| 11 | — | II | VI | V | TBPCl*9 | | MgDBS | | T900 | T123 |
|   | — | 200 | 40 | 210 | 1.0 | | 1.0 | | 3.0 | 1.0 |
| 12 | — | II | VI | V | TBPPT | | ZnDBS*10 | | T900 | T123 |
|   | — | 200 | 40 | 210 | 1.0 | | 1.0 | | 3.0 | 1.0 |
| 13 | — | II | VI | V | TBPPT | | SnDBS*11 | | T900 | T123 |
|   | — | 200 | 40 | 210 | 1.0 | | 1.0 | | 3.0 | 1.0 |
| Comp. 1 | I | — | — | IV | TBABr | TBASA | | | T900 | T123 |
|   | 200 | — | — | 115 | 0.3 | 0.6 | | | 2.0 | 1.0 |
| Comp. 2 | — | II | — | V | TBPPT | | | | T900 | T123 |
|   | — | 200 | — | 180 | 1.0 | | | | 2.0 | 1.0 |
| Comp. 3 | — | II | IV | V | MgDBS | | | | T900 | T123 |
|   | — | 200 | 40 | 210 | 1.0 | | | | 3.0 | 1.0 |
| Comp. 4 | — | II | VI | V | | | | | T900 | T123 |
|   | — | 200 | 40 | 210 | | | | | 3.0 | 1.0 |

*1 Tetrabutylammonium bromide
*2 Tetrabutylammonium salicylate
*3 Magnesium didodecylbenzenesulfonate
*4 "Tinubin 900" available from Ciba Geigy A.G.
*5 "Tinubin 123" available from Ciba Geigy A.G.
*6 Tetrabutylphosphonium diethylphosphorodithioate
*7 Tetraethylphosphonium bromide
*8 Tetrabutylphosphonium bromide
*9 Tetrabutylphosphonium chloride
*10 Zinc didodecylbenzenesulfonate
*11 Dibutyltin didodecylbenzenesulfonate Example 15 to 27

Clear coating compositions were prepared as generally described in Example 1, except using the ingredients tabulated in the following Table 4, and the same evaluations as Example 1 were conducted. The results were shown in Table 5.

TABLE 4

| Example no. | Polymers having COOH | COOH, COOR | OH, COOH | epoxy group | Curing catalysts | | | |
|---|---|---|---|---|---|---|---|---|
| 15 | VII | — | — | IV | TBANA*12 | | T900 | T123 |
|   | 80 | — | — | 75 | 0.2 | | 2.0 | 1.0 |
| 16 | VII | — | — | IV | TBANI*13 | | T900 | T123 |
|   | 80 | — | — | 75 | 0.4 | | 2.0 | 1.0 |
| 17 | VII | — | — | IV | TBABP*14 | | T900 | T123 |
|   | 80 | — | — | 75 | 0.6 | | 2.0 | 1.0 |
| 18 | VII | — | — | IV | TBABP | MgDBS | T900 | T123 |
|   | 80 | — | — | 75 | 0.4 | 1.0 | 2.0 | 1.0 |
| 19 | — | II | — | V | MBANA*15 | | T900 | T123 |
|   | — | 200 | — | 180 | 0.3 | | 2.0 | 1.0 |
| 20 | — | II | — | V | TMABP*16 | | T900 | T123 |
|   | — | 200 | — | 180 | 0.3 | | 2.0 | 1.0 |
| 21 | — | II | — | V | MBABP*17 | | T900 | T123 |
|   | — | 200 | — | 180 | 0.3 | | 2.0 | 1.0 |
| 22 | — | II | — | V | MBABP | SnDBS | T900 | T123 |
|   | — | 200 | — | 180 | 1.0 | 1.0 | 2.0 | 1.0 |
| 23 | — | II | VI | V | MBAHP*18 | SnDBS | T900 | T123 |
|   | — | 200 | 40 | 200 | 0.5 | 2.0 | 2.0 | 1.0 |
| 24 | — | II | VI | V | CABPA*19 | | T900 | T123 |
|   | — | 200 | 40 | 210 | 0.5 | | 2.0 | 1.0 |
| 25 | — | II | VI | V | CABPN*20 | | T900 | T123 |
|   | — | 200 | 40 | 210 | 0.5 | | 2.0 | 1.0 |
| 26 | VIIX | II | | IV | TBPBP*21 | | T900 | T123 |
|   | 45 | 100 | | 75 | 0.5 | | 2.0 | 1.0 |
| 27 | VIII | II | | IV | TMABP | MgDBS | T900 | T123 |
|   | 45 | 100 | | 75 | 0.5 | 2.0 | 2.0 | 1.0 |

TABLE 4-continued

| | Polymers having | | | | |
|---|---|---|---|---|---|
| Example no. | COOH | COOH, COOR | OH, COOH | epoxy group | Curing catalysts |

*12 Tetrabutylammonium nitrate
*13 Tetrabutylammonium nitrite
*14 Tetrabutylammonium dibutylphosphate
*15 Trimethylbenzylammonium nitrate
*16 Tetramethylammonium dibutylphosphate
*17 Trimethylbenzylammonium dibutylphosphate
*18 Trimethylbenzylammonium di-2-ethylhexylphosphate
*19 Trimethylcetylammonium dibutylphosphate
*20 Trimethylcetylammonium butylphosphonate
*21 Tetrabutylphosphonium dibutylphosphate

TABLE 5

| Example | Coating stability | Pencil hardness | Warm water resist. | Acid resist. |
|---|---|---|---|---|
| 1 | 15.5 | H | ○ | ⊚ |
| 2 | 17.0 | H | ○ | ⊚ |
| 3 | 10.8 | H | ○ | ⊚ |
| 4 | 11.2 | H | ○ | ⊚ |
| 5 | 11.5 | F | ○ | ○ |
| 6 | 14.5 | F | ○ | ○ |
| 7 | 10.2 | HB | ○ | ○ |
| 8 | 12.0 | F | ○ | ⊚ |
| 9 | 11.5 | F | ○ | ⊚ |
| 10 | 13.0 | F | ○ | ⊚ |
| 11 | 12.5 | F | ○ | ⊚ |
| 12 | 11.0 | F | ○ | ⊚ |
| 13 | 12.3 | F | ○ | ⊚ |
| 14 | — | H | ○ | ⊚ |
| 15 | 9.5 | F | ○ | ○ |
| 16 | 10.3 | F | ○ | ⊚ |
| 17 | 11.4 | H | ○ | ⊚ |
| 18 | 5.5 | F | ○ | ⊚ |
| 19 | 11.2 | F | ○ | ⊚ |
| 20 | 12.5 | F | △ | ⊚ |
| 21 | 10.4 | F | ○ | ⊚ |
| 22 | 7.6 | H | ○ | ⊚ |
| 23 | 4.2 | F | ○ | ⊚ |
| 24 | 10.1 | F | ○ | ⊚ |
| 25 | 10.5 | F | ○ | ⊚ |
| 26 | 9.8 | F | ○ | ○ |
| 27 | 5.1 | F | ○ | ○ |
| Comp. 1 | 185.2 | H | ○ | ⊚ |
| Comp. 2 | 121.0 | F | ○ | ⊚ |
| Comp. 3 | 1.1 | 2B | x | x |
| Comp. 4 | 2.5 | 2B | x | x |

Table 5 shows that the coating compositions of examples 1 to 27 achieve excellent storage stability and excellent curability.

We claim:

1. A solvent-borne clear coating composition having excellent storage stability comprising:

(a) a compound having at least 2 carboxyl groups;
   (b) a compound having at least 2 epoxy groups; and
   (c) 0.01 to 3.0 parts by weight based on 100 parts by weight of the total resin solid of an onium salt, wherein the onium salt (c) is represented by the formula:

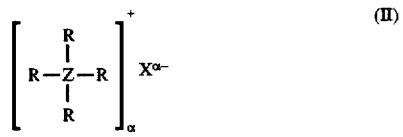

(II)

wherein, Z represents a nitrogen atom, R each independently represents a group or a moiety selected from the group consisting of an alkyl group having 1 to 20 carbon atoms, a cyclic alkyl group having 6 to 10 carbon atoms, an aryl group having 5 to 8 carbon atoms, an aralkyl group having 6 to 10 carbon atoms, a moiety which complete together with at least two of them a saturated or unsaturated heterocyclic ring comprising a nitrogen atom, and R may have at least one halogen, nitrogen or oxygen atoms, X represents an anion selected from the group consisting of a nitrite ion, a nitrate ion, an acidic phosphate ion and a phosphonate ion, and α represents an integer of 1 to 3.

2. The coating composition according to claim 1, wherein the compound having at least 2 carboxyl groups (a) is a polymer having carboxyl groups (a") having an acid value of 30 to 300 mgKOH/g solid and a number average molecular weight of 500 to 50000.

3. The coating composition according to claim 2, wherein the polymer having carboxyl groups (a") is selected from the group consisting of an acrylic polymer having carboxyl groups (a"1) and a polyester polymer having carboxyl groups (a"2), and the polymer (a") is comprised in the coating composition in an amount of 10 to 80% weight based on the total resin solid.

4. The coating composition according to claim 3, wherein the acrylic polymer having carboxyl groups (a"1) is prepared by copolymerizing 3.5 to 90% by weight of a monomer having a carboxyl group (a"1)(1) and 96.5 to 10% by weight of a monomer (a"1)(4) which is different from (a"1)(1).

5. The coating composition according to claim 4, wherein the monomer having a carboxyl group (a"1)(1) is a long-chain monomer having a terminal carboxyl group (a"1)(1').

6. The coating composition according to claim 5, wherein the acrylic polymer having carboxyl groups (a"1) is prepared by copolymerizing 5 to 90% by weight of a monomer having a carboxyl group (a"1)(1), 95 to 10% by weight of a monomer having hydroxyl group (a"1)(2) and 0 to 60% weight of a monomer (a"1)(6) which is different from (a"1)(1) and (a"1)(2).

7. The coating composition according to claim 6, wherein the monomer having a carboxyl group (a"1)(1) is a long-chain monomer having a terminal carboxyl group (a"1)(1'), and the monomer having a hydroxyl group (a"1)(2) is a long-chain monomer having a terminal hydroxyl group (a"1)(2').

8. The coating composition according to claim 4, wherein the monomer having a carboxyl group (a"1)(1) is prepared by half-esterifying a monomer having an anhydride group (a"1)(3), with a monoalcohol in an molar ratio of the anhydride group to the hydroxyl group of 1/10 to 1/1.

9. The coating composition according to claim 3, wherein the acrylic polymer having carboxyl groups (a"1) is prepared by half-esterifying a polymer having anhydride groups which is prepared by copolymerizing 10 to 40% by weight of a monomer having an anhydride group (a"1)(3) and 60 to 85% by weight of a monomer (a"1)(5) which is different from (a"1)(3), with a monoalcohol in an molar ratio of the anhydride group to the hydroxyl group of 1/10 to 1/1.

10. The coating composition according to claim 3, wherein the acrylic polymer having carboxyl groups (a"1) is prepared by half-esterifying a polymer having anhydride groups which is prepared by copolymerizing 3.5 to 45% by weight of a monomer having a carboxyl group (a"1)(1), 10 to 40% by weight of a monomer having an anhydride group (a"1)(3) and remainder amount of a monomer (a"1)(7) which is different from (a"1)(1) and (a"1)(3), with a monoalcohol in an molar ratio of the anhydride group to the hydroxyl group of 1/10 to 1/1.

11. The coating composition according to claim 1, wherein the compound having at least 2 epoxy groups (b) has an epoxy equivalent weight of 280 to 900 and a number average molecular weight of 500 to 50000.

12. The coating composition according to claim 11, wherein the compound having at least 2 epoxy groups (b) is selected from the group consisting of an acrylic polymer having epoxy groups (b1), a glycidyl ether of polyhydric alcohol (b2) and a glycidyl ester of polybasic acid (b3), and the compound (b) is comprised in the coating composition in an amount of 20 to 80% by weight based on the total resin solid.

13. The coating composition according to claim 12, wherein the acrylic polymer having epoxy groups (b1) is prepared by 10 to 60% by weight of a monomer having an epoxy group (b1)(1) and 90 to 40% by weight of a monomer (b1)(3) which is different from (b1)(1).

14. The coating composition according to claim 12, wherein the acrylic polymer having epoxy groups (b1) is an acrylic polymer having epoxy groups and hydroxyl groups (b1'), and having an epoxy equivalent weight of 280 to 900, a hydroxyl equivalent weight of 280 to 1200 and a number average molecular weight of 500 to 50000, wherein the polymer (b1') is prepared by copolymerizing 10 to 60% by weight of a monomer having a epoxy group (b1)(1), 5 to 60% by weight of a monomer having a hydroxyl group (b1)(2) and remainder amount of a monomer (b1)(4) which is different from (b1)(1) and (b1)(2).

15. The coating composition according to claim 1, wherein, in the formula (II), Z is a nitrogen atom, R each independently represents an alkyl group having 1 to 20 carbon atoms, an aryl group having 5 to 8 carbon atoms, or an aralkyl group having 6 to 10 carbon atoms and R may have at least one oxygen atom, and X is an acidic phosphate ion of the formula:

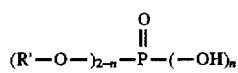

or a phosphonate ion of the formula:

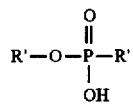

wherein, R' represents each independently an alkyl group having 1 to 20 carbons atoms, a cycloalkyl group having 6 to 10 carbon atoms, an aryl group having 5 to 8 carbon atoms or an aralkyl group having 6 to 10 carbon atoms. n is an integer of 1 to 3.

16. The coating composition according to claim 1, wherein the onium salt (c) is at least one selected from the group consisting of tetrabutylammonium dibutylphosphate, trimethylbenzylammonium dibutylphosphate, trimethylbenzylammonium di-2-ethylhexylphosphate, trimethylcetylammonium dibutylphosphate, trimethylcetylammonium butylphosphate, tetrabutylammonium di-2-ethylhexylphosphate, bis-trimethylbenzylammonium n-butylphosphate, and trimethylcetylammonium 2-ethylhexylphosphate.

17. A process for forming a cured film on a substrate comprising:

priming and/or intercoating the substrate;

applying a water-borne or solvent-borne color base paint to a primed and/or intercoated surface of the substrate;

applying a clear coating composition to a base coated surface of the substrate without curing a base coating layer; and baking both the base coating layer and the clear coating layer to cure;

an improvement being present in that the clear coating composition comprises the coating composition according to claim 1.

18. An article having a cured film thereon which is formed by the process according to claim 17.

19. A coating composition comprising:

(a"1") 20 to 80% by weight of a polymer having carboxyl groups and carboxylate groups, and having an acid value of 30 to 300 mgKOH/g solid and a number average molecular weight or 500 to 20000, wherein the polymer (a"1") is prepared by half-esterifying a polymer having anhydride groups which is prepared by copoylmerizing 10 to 40% by weight of an monomer having an anhydride group (a"1)(3) and 60 to 90% by weight of a monomer (a"1)(5) which is different from (a"1)(3), with a monoalcohol in an molar ratio of the anhydride group to the hydroxyl group of 1/10 to 1/1;

(a"1') 20 to 80% by weight of a polymer having carboxyl groups and hydroxyl groups, and having an acid value of 30 to 300 mgKOH/g solid, a hydroxyl equivalent weight of 350 to 1200 and a number average molecular weight of 1000 to 8000, wherein the polymer (a"1') is prepared by copolymerizing 5 to 90% by weight of a monomer having a carboxyl group (a"1)(1), 95 to 10% by weight of a monomer having a hydroxyl group (a"1)(2) and 0 to 60% by weight of a monomer (a"1)(6) which is different from (a"1)(1) and (a"1)(2);

(b) a compound having at least 2 epoxy groups; and (c) 0.01 to 3.0 parts by weight based on 100 parts by weight of the total resin solid of an onium salt, wherein the onium salt (c) is represented by the formula:

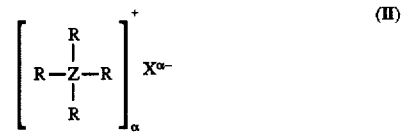

wherein, Z represent a nitrogen atom, R each independent represents a group or a moiety selected from the group consisting of an alkyl group having 1 to 20 carbon atoms, a cyclic alkyl group having 6 to 10 carbon atoms, an aryl group having 5 to 8 carbon atoms, an aralkyl group having 6 to 10 carbon atoms, a moiety which complete together with at least two of them a saturated or unsaturated heterocyclic ring comprising a nitrogen atom, and R may have at least one halogen, nitrogen or oxygen atoms, X⁻ represents an anion selected from the group consisting of a nitrite ion, a nitrate ion, an acidic phosphate ion and phosphonate ion, and α represents an integer of 1 to 3.

20. The coating composition according to claim 19, wherein the monomer having a carboxyl group (a"1)(1) is a long-chain monomer having monomer having a hydroxyl group (a"1)(1'), and the monomer having a hydroxyl group (a"1)(2) is a long-chain monomer having a terminal hydroxyl group (a"1)(2').

21. A solvent-borne clear coating composition having excellent storage stability comprising:

(a) a compound having at least 2 carboxyl groups;

(b) a compound having at least 2 epoxy groups;

(c) 0.01 to 3.0 parts by weight based on 100 parts by weight of the total resin solid of an onium salt; and (d) 0.01 to 6.0 parts by weight based on 100 parts by weight of the total resin solid of the metal salt of organic sulfonic acid which is at least one selected from the group consisting of salts of alkyl sulfonic acid and alkyl substituted aromatic sulfonic acid with metal selected from the group consisting of elements present in from the third to the fifth period and from II to VIII group of the periodic table.

22. The coating composition according to claim 21, wherein the compound having at least 2 carboxyl groups (a) is a polymer having at carboxyl groups (a") having an acid value of 30 to 300 mgKOH/g solid and a number average molecular weight of 500 to 50000.

23. The coating composition according to claim 22, wherein the polymer having carboxyl groups (a") is selected from the group consisting of an acrylic polymer having carboxyl groups (a"1) and a polyester polymer having carboxyl groups (a"2), and the polymer (a") is comprised in the coating composition in an amount of 10 to 80% by weight based on the total resin solid.

24. The coating composition according to claim 23, wherein the acrylic polymer having carboxyl groups (a"1) is prepared by copolymerizing 3.5 to 90% by weight of a monomer having a carboxyl group (a"1)(1) and 96.5 to 10% by weight of a monomer (a"1)(4) which is different from (a"1)(1).

25. The coating composition according to claim 24, wherein the monomer having a carboxyl group (a"1)(1) is a long-chain monomer having a terminal carboxyl group (a"1)(1').

26. The coating composition according to claim 25, wherein the acrylic polymer having carboxyl groups (a"1) is prepared by copolymerizing 5 to 90% by weight of a monomer having a carboxyl group (a"1)(1), 95 to 10% by weight of a monomer having hydroxyl group (a"1)(2) and 0 to 60% by weight of a monomer (a"1)(6) which is different from (a"1)(1) and (a"1)(2).

27. The coating composition according to claim 26, wherein the monomer having a carboxyl group (a"1)(1) is a long-chain monomer having a terminal carboxyl group (a"1)(1'), the monomer having a hydroxyl group (a"1)(2) is a long-chain monomer having a terminal hydroxyl group (a"1)(2').

28. The coating composition according to claim 24, wherein the monomer having a carboxyl group (a"1)(1) is prepared by half-esterifying a monomer having an anhydride group (a"1)(3), with a monoalcohol in an molar ratio of the anhydride group to the hydroxyl group of 1/10 to 1/1.

29. The coating composition according to claim 23, wherein the acrylic polymer having carboxyl groups (a"1) is prepared by half-esterifying a polymer having anhydride groups which is prepared by copolymerizing 10 to 40% by weight of a monomer having an anhydride group (a"1)(3) and 60 to 85% by weight of a monomer (a"1)(5) which is different from (a"1)(3), with a monoalcohol in an molar ratio of the anhydride group to the hydroxyl group of 1/10 to 1/1.

30. The coating composition according to claim 23, wherein the acrylic polymer having carboxyl groups (a"1) is prepared by half-esterifying a polymer having anhydride groups which is prepared by copolymerizing 3.5 to 45% by weight of a monomer having a carboxyl group (a"1)(1), 10 to 40% by weight of a monomer having an anhydride group (a"1)(3) and remainder amount of a monomer (a"1)(7) which is different from (a"1)(1) and (a"1)(3), with a monoalcohol in an molar ratio of the anhydride group to the hydroxyl group of 1/10 to 1/1.

31. The coating composition according to claim 21, wherein the compound having at least 2 epoxy groups (b) has an epoxy equivalent weight of 280 to 900 and a number average molecular weight of 500 to 50000.

32. The coating composition according to claim 31, wherein the compound having at least 2 epoxy groups (b) is selected from the group consisting of an acrylic polymer having epoxy groups (b1), a glycidyl ether of polyhydric alcohol (b2) and a glycidyl ester of polybasic acid (b3), and the compound (b) is comprised in the coating composition in an amount of 20 to 80% by weight based on the total resin solid.

33. The coating composition according to claim 32, wherein the acrylic polymer having epoxy groups (b1) is prepared by 10 to 60% by weight of a monomer having an epoxy group (b1)(1) and 90 to 40% by weight of a monomer (b1)(3) which is different from (b1)(1).

34. The coating composition according to claim 32, wherein the acrylic polymer having epoxy groups (b1) is an acrylic polymer having epoxy groups and hydroxyl groups (b1'), and having an epoxy equivalent weight of 280 to 900, a hydroxyl equivalent weight of 280 to 1200 and a number average molecular weight of 500 to 50000, wherein the polymer (b1') is prepared by copolymerizing 10 to 60% by weight of a monomer having a epoxy group (b1)(1), 5 to 60% by weight of a monomer having a hydroxyl group (b1)(2) and remainder amount of a monomer (b1)(4) which is different from (b1)(1) and (b1)(2).

35. The coating composition according to claim 21, wherein the onium salt (c) is represented by the formula:

wherein, Z represent a nitrogen atom or a phosphorus atom, R each independently represents a group or a moiety selected from the group consisting of an alkyl group having 1 to 20 carbon atoms, a cyclic alkyl group having 6 to 10 carbon atoms, an aryl group having 5 to 8 carbon atoms, an aralkyl group having 6 to 10 carbon atoms, a moiety which complete together with at least two of them a saturated or unsaturated heterocyclic ring comprising a nitrogen atom, and R may have at least one halogen, nitrogen or oxygen atoms, X⁻ represents an anion selected from the group consisting of a halide ion, an organic carboxylate ion, a nitrite ion, a nitrate ion, an acidic phosphate ion and a phosphonate ion, and α represents an integer of 1 to 3.

36. The coating composition according to claim 21, wherein the onium salt (c) is at least one selected from the group consisting of trimethylbenzylammonium bromide, trimethylbenzylammonium chloride, trimethylbenzylammonium salicylate, trimethylbenzylammonium glycolate, trimethylbenzylammonium paratoluenesulfonate, tetrabutylammonium bromide, tetrabutylammonium chloride, tetrabutylammonium salicylate, tetrabutylammonium glycolate, tetrabutylammonium paratoluenesulfonate and trimethylbenzylammonium bromide.

37. The coating composition according to claim 21, wherein the onium salt (c) is at least one selected from the group consisting of tetrabuthylphosphonium diethylphosphorodithioate, tetrabutylammonium nitrate, tetrabutylammonium nitrate tetrabutylammonium dibuthylphosphate, trimethylbenzylammonium nitrate, trimethylbenzylammonium dibuthylphosphate, trimethylbenzylammonium di-2-ethylexylphosphate, trimethylcetylammonium dibuthylphosphate, trimethylcetylammonium buthylphosphonate, tetrabuthylphosphonium dibuthylphosphate, tetrabutylammonium di-2-ethylexylphosphate, bis-trimethylbenzylammonium n-butylphosphate, tetraethylphosphonium diethylphosphorodithioate, tributylbenzylphosphonium bromide, and trimethylcetylammonium 2-ethylhexylphosphate.

38. The coating composition according to claim 21, wherein the organic sulfonic acid salt (d) is at least one selected from the group consisting of di-n-butyltin didodecylbenzenesulfonate, di-n-butyltin diparatoluenesulfonate, magnesium didodecylbenzenesulfonate and zinc didodecylbenzenesulfonate.

39. A process for forming a cured film on a substrate comprising:

priming and/or intercoating the substrate;

applying a water-borne or solvent-borne color base paint to a prime and/or intercoated surface of the substrate;

applying a clear coating composition to a base coated surface of the substrate without curing a base coating layer; and baking both the base coating layer and the clear coating layer to cure;

an improvement being in that the clear coating composition comprises the coating composition according to claim 21.

40. An article having a cured film thereon which is formed by the process according to claim 39.

41. A solvent-borne clear coating composition comprising:

(a"1") 20 to 80% by weight of a polymer having carboxyl groups and carboxylate groups, and having an acid value of 30 to 300 mgKOH/g solid and a number average molecular weight of 500 to 20000, wherein the polymer (a"1") is prepared by half-esterifying a polymer having anhydride groups which is prepared by copolymerizing 10 to 40% by weight of a monomer having an anhydride group (a"1) (3) and 60 to 90% by weight of a monomer (a"1) (5) which is different from (a"1) (3), with a monoalcohol in a molar ratio of the anhydride group to the hydroxyl group of 1/10 to 1/1;

(a"1") 20 to 80% by weight of a polymer having carboxyl groups and hydroxyl groups, and having an acid value of 30 to 300 mgKOH/g solid, a hydroxyl equivalent weight of 350 to 1200 and a number average molecular weight of 1000 to 8000, wherein the polymer (a"1") is prepared by copolymerizing 5 to 90% by weight of a monomer having a carboxyl group (a"1) (1), 95 to 10% by weight of a monomer having a hydroxyl group (a"1) (2) and 0 to 60% by weight of a monomer (a"1)(6) which is different from (a"1)(1) and (a"1)(2);

(b) a compound having at least 2 epoxy groups;

(c) 0.01 to 3.0 parts by weight based on 100 parts by weight of the total resin solid of an onium salt; and (d) 0.01 to 6.0 parts by weight based on 100 parts by weight of the total resin solid of the metal salt of organic sulfonic acid which is at least one selected from the group consisting of salts of alkyl sulfonic acid and alkyl substituted aromatic sulfonic acid with metal selected from the group consisting of elements present in from the third to the fifth period and from II to VIII group of the periodic table.

42. The coating composition according to claim 41, wherein the monomer having a carboxyl group (a"1)(1) is a long-chain monomer having a terminal carboxyl group (a"1)(1'), and the monomer having a hydroxyl group (a"1)(2) is a long-chain monomer having a terminal hydroxyl group (a"1)(2').

* * * * *